United States Patent
Gatz

(10) Patent No.: US 7,487,499 B2
(45) Date of Patent: Feb. 3, 2009

(54) LOCATION BASED SOFTWARE FLASHING SYSTEM

(75) Inventor: Michael C. Gatz, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 810 days.

(21) Appl. No.: 10/975,491

(22) Filed: Oct. 29, 2004

(65) Prior Publication Data

US 2006/0101449 A1 May 11, 2006

(51) Int. Cl.
*G06F 9/44* (2006.01)
*G06F 9/45* (2006.01)
*G01C 9/00* (2006.01)
*G01C 21/00* (2006.01)

(52) U.S. Cl. .............. 717/168; 717/174; 702/150; 701/213

(58) Field of Classification Search .......... 717/168, 717/174; 715/700; 702/150; 704/2
See application file for complete search history.

(56) References Cited

U.S. PATENT DOCUMENTS

| | | | |
|---|---|---|---|
| 6,256,498 B1 | 7/2001 | Ludwig | |
| 6,282,712 B1 | 8/2001 | Davis et al. | |
| 6,530,081 B1 | 3/2003 | Hayes, Jr. | |
| 6,629,136 B1 | 9/2003 | Naidoo | |
| 6,691,106 B1 | 2/2004 | Sathyanarayan | |
| 6,747,556 B2 | 6/2004 | Medema et al. | |
| 2002/0046259 A1 | 4/2002 | Glorikian | |
| 2003/0014297 A1* | 1/2003 | Kaufman et al. | 705/9 |
| 2003/0066065 A1 | 4/2003 | Larkin | |
| 2003/0143988 A1 | 7/2003 | Jamadagni | |
| 2003/0208685 A1 | 11/2003 | Abdel-Rahman | |
| 2004/0260766 A1* | 12/2004 | Barros et al. | 709/203 |
| 2006/0230350 A1* | 10/2006 | Baluja | 715/700 |
| 2006/0259268 A1* | 11/2006 | Vock et al. | 702/150 |
| 2008/0021697 A1* | 1/2008 | Cox et al. | 704/2 |

FOREIGN PATENT DOCUMENTS

| | | |
|---|---|---|
| WO | WO 99/04582 | 1/1999 |
| WO | WO 2004/028183 | 4/2004 |

* cited by examiner

*Primary Examiner*—Lewis A. Bullock, Jr.
*Assistant Examiner*—Insun Kang
(74) *Attorney, Agent, or Firm*—Finnegan, Henderson, Farabow, Garrett & Dunner

(57) ABSTRACT

A software flashing system includes a processor and a position locating system in communication with the processor and configured to provide information relating to a geographic location of at least one target entity. The processor is configured to interface with the position locating system to determine the geographic location of the at least one target entity and to supply the at least one target entity with a software update related to the geographic location of the at least one target entity.

33 Claims, 3 Drawing Sheets

LOCATION BASED SOFTWARE FLASHING SYSTEM

TECHNICAL FIELD

The present disclosure is directed to a software flashing system and, more particularly, to a software flashing system configured to supply a software update to a target entity based on the geographic location of the target entity.

BACKGROUND

Software may be flashed into systems for controlling various operations of a wide array of electronically controlled devices. For many applications, this software may include certain control features designed to enable the electronically controlled devices to operate in a manner compliant with or consistent with regulations or customs of a particular geographic region. For example, an electronically controlled display device for use in France may be configured to display words in the French language. Similarly, radio transmission devices may be programmed to operate with certain frequency, power, modulation, and other characteristics to comply with the transmission guidelines of the country or countries where the radio is used. There are many other types of devices whose operation may be electronically controlled in accordance with the requirements or customs of a specific geographic location.

Current software flashing systems for providing control software to various types of devices require a user to know that a particular software application or other software element related to the electronic control of a device is suitable for the geographic location where the device is intended for use. Often, however, the user of a software flashing system may be unfamiliar with the operational features of the software and software related elements being installed on a system. Further, the user of the software flashing system may be unfamiliar with the regulations and customs of a particular geographic location that may affect the settings or choice of software being distributed by the software flashing system. Thus, the user may lack the knowledge necessary to ensure that the software flashed to a device control system is appropriate for the geographic location of intended use.

Certain systems have been developed that are capable of providing geographic location specific content to computers connected to a network. For example, U.S. Pat. No. 6,629,136 issued on Sep. 30, 2003, to Naidoo (hereinafter "the '136 patent") describes a network based system in which a user computer node is provided with content selected based upon the user's geographic location. Specifically, the user's geographic location may be forwarded to a content provider over a network. In response, the content provider may access a content database, select content information based on the user's geographic location, and forward the selected information to the user node.

While the system of the '136 patent may be suitable for supplying data and/or other types of information to a user based on the geographic location of the user, the system has several shortcomings. For example, the system of the '136 patent does not include a software flashing capability for providing software updates to the user. Further, the system of the '136 patent lacks a software flashing tool configured to deliver software updates, including software updates related to a particular geographic location, to a target entity.

The present disclosure is directed to overcoming one or more of the problems of the prior art localized content delivery system.

SUMMARY OF THE INVENTION

One aspect of the present disclosure includes a software flashing system. The system includes a processor and a position locating system in communication with the processor and configured to provide information relating to a geographic location of at least one target entity. The processor is configured to interface with the position locating system to determine the geographic location of the at least one target entity and to supply the at least one target entity with a software update related to the geographic location of the at least one target entity.

Another aspect of the present disclosure includes a method for providing a software update to a target entity. The method includes establishing communication between a software flashing system and at least one target entity and determining a geographic location of the at least one target entity. At least one software update may be supplied to the target entity. The at least one software update includes a characteristic associated with the geographic location of the at least one target entity.

Another aspect of the disclosure includes a software flashing system. The system includes a processor and a GPS receiver operatively coupled to the software flashing system and configured to provide the processor with position information related to a geographic location of the software flashing system. The processor may be configured to determine the geographic location of the software flashing system using the position information supplied by the GPS receiver. The processor may also identify at least one software update available for a preselected target entity and supply the preselected target entity with the at least one available software update. The at least one available software update may be configured to affect operation of an element associated with the preselected target entity in a manner related to the determined geographic location.

DETAILED DESCRIPTION

Figure 1:
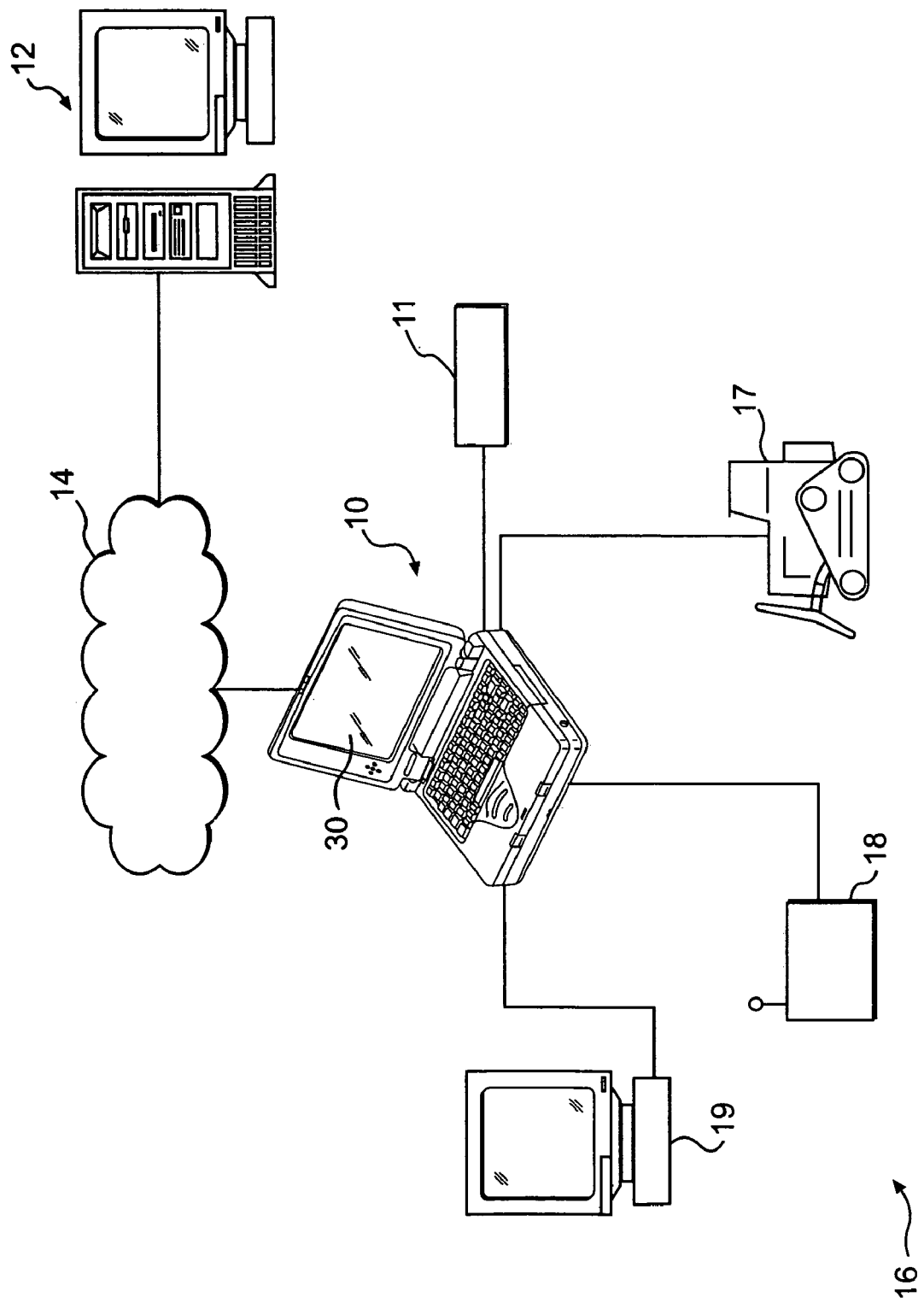
FIG. 1 is a diagrammatic representation of software flashing system according to an exemplary disclosed embodiment.

FIG. 1 provides a diagrammatic representation of a software flashing system 10 according to an exemplary disclosed embodiment. Software flashing system 10 may include a data supply unit 11 and may be configured for communication with a workstation 12, or multiple workstations, over a network 14. Software flashing system 10 may also be configured for supplying software updates to at least one target entity 16. As shown in FIG. 1, target entity 16 may include a work machine 17, a programmable transmission device 18, and/or a display device 19. This list, however, is not exhaustive. Rather, target entity 16 may include any type of device having one or more electronically controlled components or elements. While software flashing system 10 is shown in FIG. 1 configured as a laptop computer, software flashing system 10 may include any type of processor based device suitable for supplying a software update to target entity 16.

Software flashing system 10 may be configured to determine its own geographic location and/or the geographic location of target entity 16. Using this positional information, software flashing system 10 may select and provide appropriate software updates to target entity 16. For example, the software updates provided to target entity 16 may enable target entity 16 to operate in a manner that complies with regulations or customs specific to the determined geographic location.

Data supply unit 11 may include any type of device capable of reading or extracting information from a computer readable medium. For example, data supply unit 11 may include an optical storage device reader, a magnetic storage device reader, a CD-ROM drive, a DVD drive, a floppy drive, a hard drive, a flash memory device, a magnetic card reader, a bar code scanner, and/or a tape drive. Data supply unit 11 may be used to supply information to software flashing system 10. This information may include software applications, software related elements, and/or position data related to the position of software flashing system 10 and/or target entity 16. Ultimately, however, data supply unit 11 may be used to provide any type of information to software flashing system 10.

Workstation 12 may be a computing device located remotely from software flashing system 10. In one embodiment, workstation 12 may be configured for communication with software flashing system 10 via network 14. Network 14 may be an intranet configured for access by authorized users internal to an organization. Alternatively, the network may include the Internet and one or more web sites. Communication between software flashing system 10 and workstation 12 may be established using wireless networking components, modem connections, gateways, routers, repeater units, and any other networking components that may be known in the art. Workstation 12 may supply software flashing system 10 with various types of information including, for example, software applications and/or software related elements. Further, workstation 12 may supply software flashing system 10 with positional information related to software flashing system 10 and/or target entity 16. For example, one or more tracking devices configured to determine the geographic location of software flashing system 10 and/or target entity 16 may be associated with workstation 12. The positional information obtained using these tracking devices may be supplied to software flashing system 10 via network 14.

As noted above, target entity 16 may include any type of device having one or more electronically controlled components or elements. Specifically, target entity 16 may include a control system including one or more processors configured to affect operation of certain components of target entity 16. In many applications, these components may be operated to comply with regulations and/or customs associated with a particular geographic location. For example, an electronic controller associated with work machine 17 may control lights, audible alarms, work implement actuators, engine operating parameters, etc. of work machine 17 in order to comply with country or state specific regulations relating to light signal patterns, alarm warning requirements, operator vibration exposure, and noise level, among others. Similarly, an electronic control device (e.g., a processor or programmable memory) associated with programmable transmission device 18 may be configured such that transmitted signals comply with various regulations related to signal frequency, power, modulation, etc. Further, other devices, such as display device 19 may be configured to operate according to customs specific to a particular geographic location. For example, the language displayed on display device 19 may be selected according the predominant language used in a particular geographic location.

Figure 2:
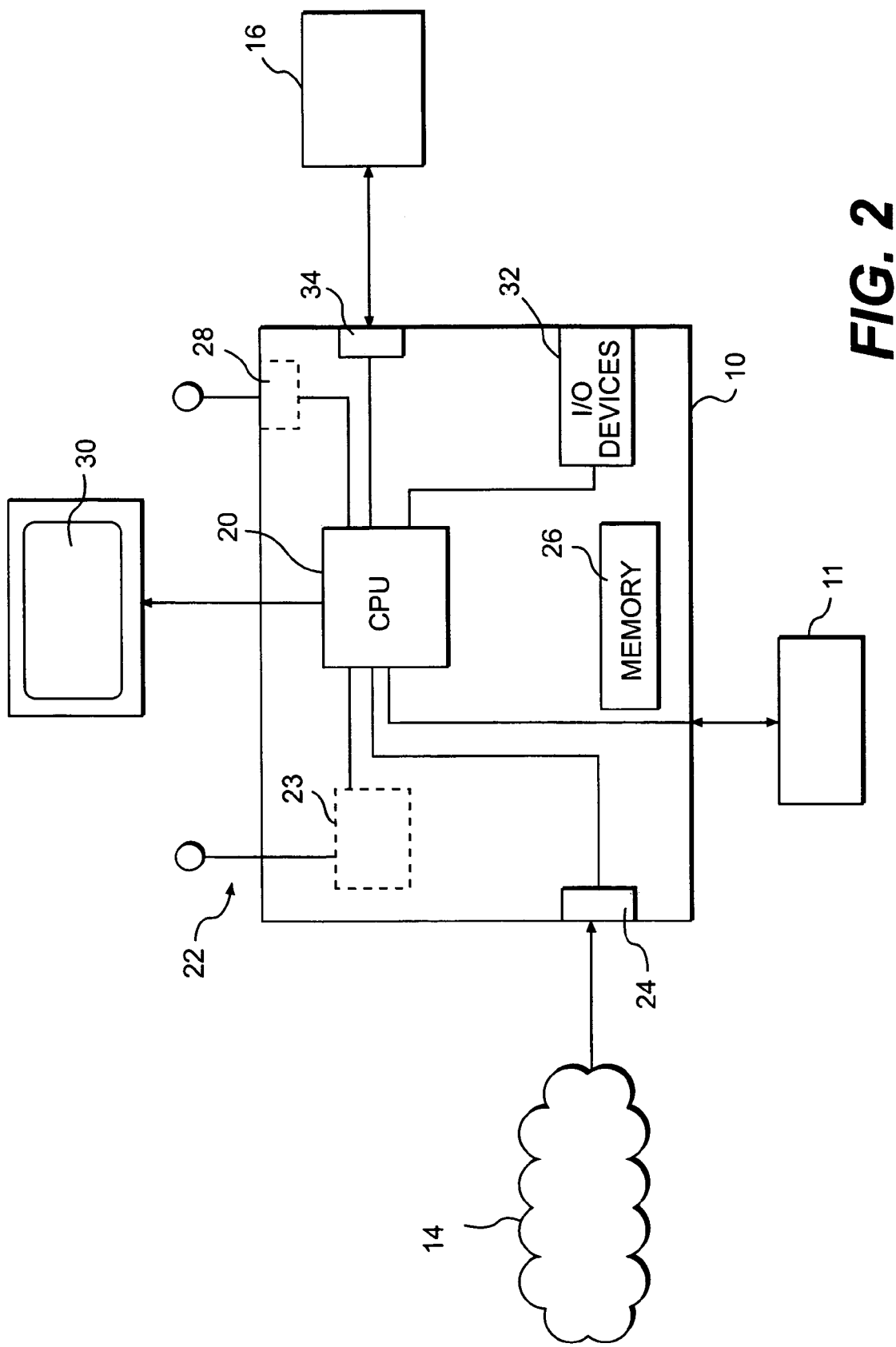
FIG. 2 is a schematic block diagram representation of a software flashing system according to an exemplary disclosed embodiment.

FIG. 2 provides a schematic block diagram representation of software flashing 10 system. In one embodiment, software flashing 10 system may include a processor 20 and a position locating system 22 in communication with processor 20. Software flashing system 10 may also include a network communication device 24, a memory 26, a transceiver 28, a display 30, and at least one input/output device 32 (e.g., a keyboard, mouse, etc.).

Position locating system 22 may be configured to provide information relating to a geographic location of at least one target entity 16 to processor 20. In one embodiment, position locating system 22 may be mounted onboard software flashing system 10 and may include a global positioning system (GPS) receiver 23. Using GPS receiver 23, the geographic location of software flashing system 10 may be determined. In situations where software flashing system 10 is proximally located to target entity 16, the geographic location of target entity 16 may be assumed as the same geographic location determined for software flashing system 10.

In another embodiment, position locating system 22 may include transceiver 28 configured to receive signals transmitted by a source external to software flashing system 10. For example, transceiver 28 may receive signals from one or more target entities 16 that convey the geographic locations of the one or more target entities 16 to software flashing system 10. Additionally, transceiver 28 may receive signals from various tracking entities (not shown) configured to track the geographic locations of one or more target entities 16. The signals received by transceiver 28 may include additional information related to the one or more target entities 16, including, for example, identification information and any other appropriate information. The information received by transceiver 28 may be decoded or demodulated and forwarded to processor 20. Ultimately, transceiver 28 may be configured to receive any type of signals that can be translated into a known position of software flashing system 10. In certain embodiments, transceiver 28 may receive such a signal from a cellular tower that broadcasts a location identifier over a limited range. Further, transceiver may receive one or more signals from a local rail line, radio station, air traffic control tower, etc. from which position information relating to software flashing system 10 may be determined or derived.

Position locating system 22 may also include input/output device 32. For example, in certain embodiments, an operator of software flashing system 10 may manually enter the geographic location of one or more target entities using, for example, a keyboard associated with software flashing system 10. Input/output device 32 may be configured to supply the manually entered geographic location information to processor 20.

Position locating system 22 may also include data supply unit 11. For example, in certain embodiments, processor 20 may communicate with data supply unit 11 to read the positions of one or more target entities 16 from a computer readable medium.

In still other embodiments, position locating system 22 may include network communication device 24. For example, signals relating to the geographic location of one or more target entities 16 may be conveyed to software flashing system 10 and, ultimately, to processor 20 over network 14. In this embodiment, a system remote from software flashing system 10, e.g., workstation 12, may be configured to track and maintain a database of the locations of the one or more target entities 16. Software flashing system 10 may be configured to contact workstation 12 via network 14 and download the tracked locations of target entities 16.

In addition to interfacing with position locating system 22 to determine the geographic location of at least one target entity 16, processor 20 may be configured to supply at least one target entity 16 with a software update. This software update may be related to the geographic location of the at least one target entity 16. For example, software flashing system 10 may maintain in memory 26, for example, a database of location-based software updates for various types of target entities 16. Based on the geographic location, and, optionally, on one or more characteristics associated with a selected target entity 16 (e.g., the identity, type, class, etc. of selected target entity 16), processor 20 may compile a set of location-based software updates available to the selected target entity. Processor 20 may be configured to automatically provide one or more of the available software updates to selected target entity 16. Alternatively, processor 20 may be configured to accept an operator input designating which of the software updates are to be provided to selected target entity 16. Processor 20 may then provide to selected target entity 16 only those software updates designated by the operator input.

In addition to retrieving the location-based software updates from memory 26, processor 20 may be configured to retrieve one or more software updates from a computer readable medium supplied to data supply unit 11, for example. Additionally, processor 20 may be configured to receive one or more location-based software updates via network 14 and network communication device 24.

The software update supplied to target entity 16 may include any type of information, data, code, flag setting, or application intended to have a geographic location-related operational effect on target entity 16. In one embodiment, the software update includes a value setting of a variable available for use by a controller associated with target entity 16. For example, such a variable may have a range of values, and each value may be associated with a set of operational parameters related to a particular geographic region or location. Setting the value of this variable may cause target entity 16 to enter an operational mode appropriate for the geographic location of the target entity 16.

Additionally, the software update may include sending an executable file to target entity 16 and/or installing a new application on target entity 16. Alternatively, the software update may include overwriting one or more files or an entire application previously installed on target entity 16. The software update may include providing a patch to an application previously installed on target entity 16. The software update may include selecting a language setting associated with target entity 16 (e.g., what language is to be used with a display or audio indicator device). The software update may include activating an application previously installed on target entity 16. The software update may also include electronically implementable guidelines for complying with regulations associated with operation of target entity 16 in a particular geographic location.

In certain exemplary embodiments, the software update may be configured to affect at least one of an engine setting for a work machine, a ground speed limit for a work machine, an electrical system setting for a work machine (e.g., light intensity or display patterns, operating voltage, etc.), an audio setting for an audio device (volume, sound type, frequency, etc.), a transmission characteristic setting for a transmitting device (e.g., frequency, modulation, power level, etc.), or a language setting for an electronic device.

Software flashing system 10 may also include a communication device 34 for establishing communication between software flashing system 10 and target entity 16. Communication device 34 may be configured, for example, to transfer the software update from software flashing system 10 to target entity 16. Communication device 34 may communicate with target entity 16 via one or more of a radio frequency (RF) coupling, an inductive coupling, a wired connection, or an optical signal. Alternatively, communication device 34 may include a reader for computer readable media (e.g., magnetic, optical, or other) that may be transferred between target entity 16 and software flashing system 10.

INDUSTRIAL APPLICABILITY

The disclosed software flashing system 10 may be used to provide location-based software updates to any type of electronically controllable device. Because software flashing system 10 includes a position locating system 22, the geographic locations of software flashing system 10 and/or target entity 16 may be automatically employed in determining whether a particular software update would be suitable for a selected target entity. Thus, a user of software flashing system 10 would not be required to be familiar with the compatibility or appropriateness of a particular software update with respect to a selected target entity 16. Further, the user of software flashing system 10 need not be familiar with the regulations or customs of a particular geographic location to properly install or otherwise provide an appropriate software update to target entity 16.

Figure 3:
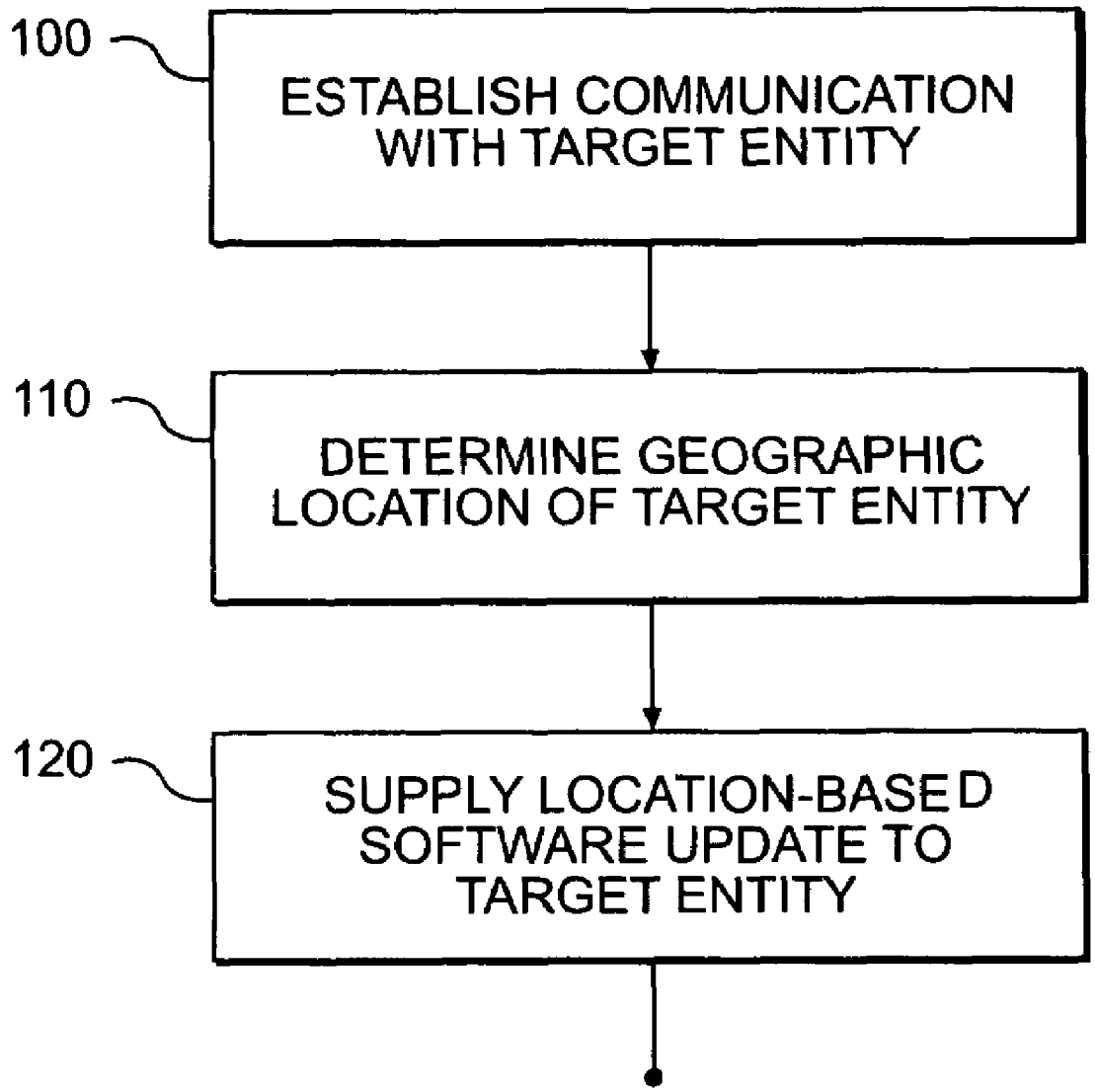
FIG. 3 is a flow chart diagram of a software flashing method according to an exemplary disclosed embodiment.

FIG. 3 provides a flow chart diagram of an exemplary method for providing a software update to target entity 16, or a processing device associated with target entity 16. At step 100, communication may be established between software flashing system 10 and target entity 16. It should be noted that communication may proceed between only one target entity 16 or, alternatively, among multiple target entities 16. At step 110, a geographic location of target entity 16 may be determined. At step 120, at least one software update may be supplied to target entity 16 (or to multiple target entities). The at least one software update may include a characteristic associated with the geographic location of target entity 16.

Depending on the needs of a particular configuration, communication between software flashing system 10 and target entity 16 may be established through at least one of an RF coupling, an inductive coupling, a wired connection, or an optical connection.

The geographic location of target entity 16 may be determined in a variety of ways. For example, the geographic location of target entity 16 may be downloaded from target entity 16 itself. Alternatively, the geographic location of target entity 16 may be determined by determining a position of software flashing system 10 and relating the position of software flashing system 10 to the geographic location of target entity 16. For example, the position of software flashing system 10 may be determined using GPS receiver 23. The geographic location of target entity 16 may be determined based on a known relationship to the position of software flashing system 10. Alternatively, however, the geographic location of target entity 16 may simply be equated to the determined position of software flashing system 10. Further, the geographic location of target entity 16 may be determined by downloading the geographic location of the target entity 16 from a source external to both software flashing system 10 and target entity 10.

It will be apparent to those skilled in the art that various modifications and variations can be made in the disclosed software flashing system without departing from the scope of the disclosure. Additionally, other embodiments of the disclosed system will be apparent to those skilled in the art from consideration of the specification. It is intended that the specification and examples be considered as exemplary only, with a true scope of the disclosure being indicated by the following claims and their equivalents.

The invention of claimed is:

1. A software flashing system, comprising:
   a processor; and
   a position locating system in communication with the processor and configured to provide information relating to a geographic location of at least one target entity;
   wherein the processor is configured to:
   interface with the position locating system to determine the geographic location of the at least one target entity;
   supply the at least one target entity with a software update that modifies an application previously installed on the at least one target entity or installs a new application on the at least one target entity, the software update being related to the geographic location of the at least one target entity;
   determine a characteristic associated with the at least one target entity;
   compile a set of location based software updates available to the at least one target entity based on the characteristic associated with the at least one target entity; and
   select the software update to be supplied to the at least one target entity from the compiled set of location based software updates.

2. The software flashing system of claim 1, wherein the position locating system includes at least one global positioning system receiver.

3. The software flashing system of claim 1, wherein the position locating system includes a transceiver configured to receive position information from a source external to the software flashing system.

4. The software flashing system of claim 1, wherein the position locating system includes an input device configured to receive position information manually entered by an operator.

5. The software flashing system of claim 1, wherein the position locating system is configured to download the geographic location of the at least one target entity from at least one of the target entity and a source external to both the target entity and the software flashing system.

6. The software flashing system of claim 1, wherein the position locating system is configured to read the geographic location of the at least one target entity from a computer readable medium.

7. The software flashing system of claim 1, further including at least one communications component configured to transfer the software update from the software flashing system to the at least one target entity.

8. The software flashing system of claim 7, wherein the communications component is configured to transfer the software update from the software flashing system to the at least one target entity via at least one of an RF coupling, an inductive coupling, a wired connection, an optical signal, or a computer readable media.

9. The software flashing system of claim 1, wherein the characteristic includes an identity of the at least one target entity.

10. The software flashing system of claim 1, wherein the software update includes setting a value of a variable available for use by a controller associated with the at least one target entity.

11. The software flashing system of claim 1, wherein the software update includes sending an executable file to the at least one target entity.

12. The software flashing system of claim 1, wherein the software update includes sending an executable file that is configured to install the new application on the at least one target entity.

13. The software flashing system of claim 1, wherein the software update includes overwriting an application previously installed on the at least one target entity.

14. The software flashing system of claim 1, wherein the software update includes providing a patch to an application previously installed on the at least one target entity.

15. The software flashing system of claim 1, wherein the software update includes selecting a language setting associated with the at least one target entity.

16. The software flashing system of claim 1, wherein the software update includes activating an application previously installed on the at least one target entity.

17. The software flashing system of claim 1, wherein the software update includes guidelines for complying with regulations associated with operation of the at least one target entity in the geographic location.

18. The software flashing system of claim 1, wherein the processor is configured to retrieve the software update from a computer readable medium.

19. The software flashing system of claim 1, wherein the processor is configured to receive the software update, for supplying to the at least one target entity, over a network.

20. The software flashing system of claim 1, wherein the target entity includes a control system associated with a work machine, wherein the control system includes a controller for controlling at least one component associated with the work machine.

21. The software flashing system of claim 1, wherein the software update is configured to affect at least one of an engine setting for a work machine, a ground speed limit for a work machine, an electrical system setting for a work machine, an audio setting for an audio device, a transmission characteristic setting for a transmitting device, or a language setting for an electronic device.

22. The software flashing system of claim 1, wherein the target entity includes a programmable transmission device.

23. The software flashing system of claim 1, wherein the processor is configured to supply the at least one target entity with the software update that installs the new application on the at least one target entity.

24. A method for providing a software update to a target entity, comprising:
   establishing communication between a software flashing system and at least one target entity;
   determining a geographic location of the at least one target entity; and
   supplying at least one software update to the target entity that modifies an application previously installed on the target entity or installs a new application on the target entity,
   the at least one software update including a characteristic associated with the geographic location of the at least one target entity,
   wherein supplying the at least one software update further comprises:
   determining a characteristic associated with the target entity;
   compiling a set of location based software updates available to the target entity based on the characteristic associated with the target entity; and
   selecting the software update to be supplied to the target entity from the compiled set of location based software updates.

25. The method of claim 24, wherein establishing communication between the software flashing system and the at least one target entity includes establishing at least one of an RF coupling, an inductive coupling, a wired connection, or an optical connection between the software flashing system and the at least one target entity.

26. The method of claim 24, wherein determining the geographic location of the at least one target entity includes downloading the geographic location of the at least one target entity from the at least one target entity.

27. The method of claim 24, wherein determining the geographic location of the at least one target entity includes determining a position of the software flashing system and relating the position of the software flashing system to the geographic location of the at least one target entity.

28. The method of claim 27, wherein determining the geographic location of the at least one target entity includes determining a position of the software flashing system using a GPS receiver associated with the software flashing system and using the determined position of the software flashing system as the geographic-location.

29. The method of claim 24, wherein determining the geographic location of the at least one target entity includes downloading the geographic location of the at least one target entity from a source external to both the software flashing system and the at least one target entity.

30. The method of claim 24, wherein the set of available software updates is generated by accessing at least one device remotely located from the software flashing system.

31. The method of claim 24, wherein the set of available software updates is generated by accessing a database associated with the software flashing system.

32. The method of claim 24, wherein supplying the at least one software update to the target entity includes at least one of overwriting a previously installed application, providing a patch to a previously installed application, altering the value of a variable, setting a language setting, providing guidelines for complying with regulations associated with the geographic location, or activating a previously installed application.

33. A software flashing system, comprising:

a processor; and a GPS receiver operatively coupled to the software flashing system and configured to provide the processor with position information related to a geographic location of the software flashing system;

wherein the processor is configured to:

determine the geographic location of the software flashing system using the position information supplied by the GPS receiver;

determine a characteristic associated with a preselected target entity;

compile a set of location based software updates available to the preselected target entity based on the characteristic associated with the preselected target entity;

select the software update to be supplied to the preselected target entity from the compiled set of location based software updates; and supply the preselected target entity with the software update that modifies an application previously installed on the preselected target entity or installs a new application on the preselected target entity, the software update being configured to affect operation of an element associated with the preselected target entity in a manner related to the determined geographic location.

* * * * *